No. 831,887. PATENTED SEPT. 25, 1906.
J. H. NICHOLSON.
MANUFACTURE OF COMPOUND TUBES.
APPLICATION FILED MAY 18, 1905.
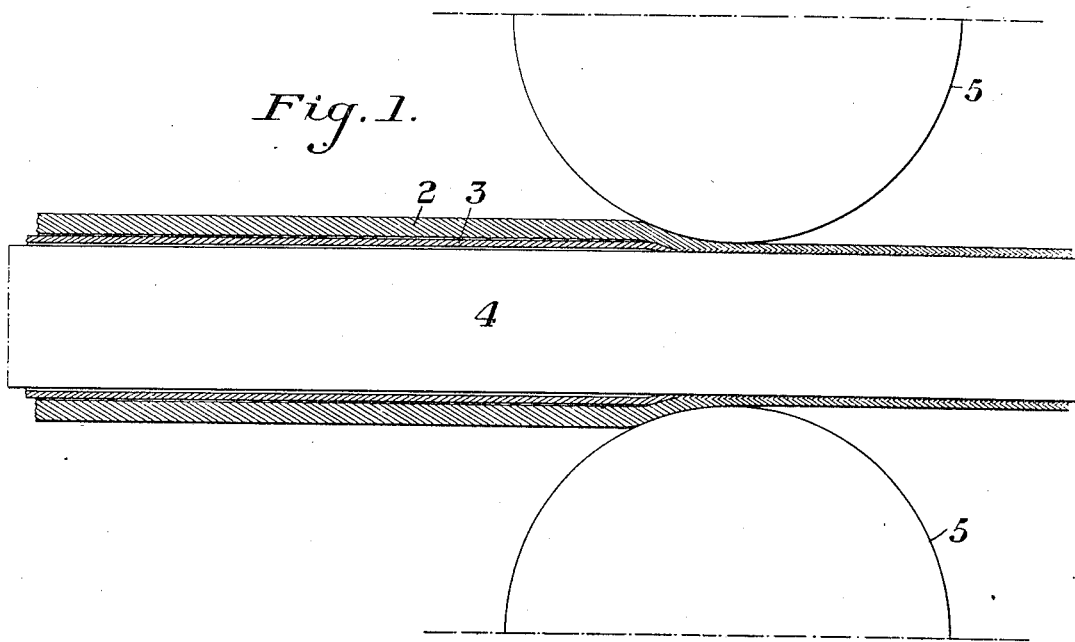
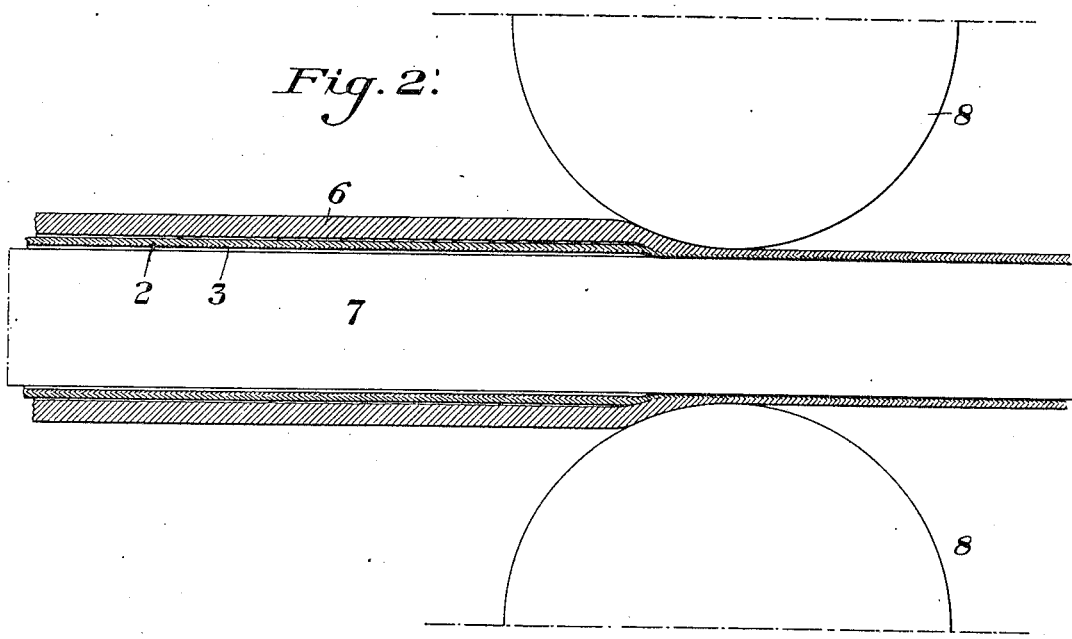

UNITED STATES PATENT OFFICE.

JOHN H. NICHOLSON, OF PITTSBURG, PENNSYLVANIA, ASSIGNOR TO NATIONAL TUBE COMPANY, OF PITTSBURG, PENNSYLVANIA, A CORPORATION OF NEW JERSEY.

MANUFACTURE OF COMPOUND TUBES.

No. 831,887.   Specification of Letters Patent.   Patented Sept. 25, 1906.

Application filed May 18, 1905. Serial No. 261,093.

*To all whom it may concern:*

Be it known that I, JOHN H. NICHOLSON, of Pittsburg, in the county of Allegheny and State of Pennsylvania, have invented a new and useful Improvement in the Manufacture of Compound Tubes, of which the following is a full, clear, and exact description, reference being had to the accompanying drawings, forming part of this specification, in which—

Figures 1 and 2 are diagrammatic views illustrating the different steps of my improved method of manufacture.

My present invention is an improvement in the manufacture of compound tubes which is described and claimed in an application filed by me on April 25, 1904, Serial No. 204,704. In that application I describe the manufacture of a steel or iron tube provided with a welded covering of nickel, applied either to the exterior or interior surface, or to both, in order to give the tube a non-corrodible surface, and I claim, among other things, as a new article of manufacture a tube having a steel body with a thin nickel tube welded thereto and also the method of making a compound tubular blank, consisting in nesting together a heavy-walled hollow steel blank and a thin-walled nickel tube, heating the compound blank to a welding temperature, and then compressing, welding, and rolling the same into a tube, substantially as described in said application. In practicing this method I have found that if nickel linings lighter than fifteen per cent. are produced some difficulties are encountered, owing to changes occurring in the proportional thicknesses existing between the nickel and steel that tend to produce thin places or spots in the nickel lining. This is due to the irregularities of the interior surface of the pierced steel billet and to the very thin nickel tube that is welded thereto, and there is danger that in the finished tube there might be some spots or places not thoroughly covered with nickel. The ordinary pierced billet that is best suited for swaging-mill work is from five-eighths to three-fourths of an inch thick. If a ten-per-cent. lining is required, the lining-tube will have to be fifteen to sixteen gage, and if a five-per-cent. lining is required the lining-tube will have to be twenty to twenty-one gage.

Difficulties arise in maintaining the original proportional thicknesses existing between the nickel and steel when welding a very thin nickel tube to the rough interior surface of the steel billet. To overcome these difficulties and to secure a method whereby a very thin nickel lining can be secured without materially disturbing the proportional thicknesses existing between the nickel and steel, I resorted to improvements in the former method of manufacture and invented an improved method which contains novel features and eliminates the difficulties originally encountered. I observed in operating under the original method that the thicker the lining-tube the easier it was to effect a satisfactory weld and less disturbances occurred between the proportional thicknesses of the nickel and steel in the welding and rolling operation, and this suggested the following improvement over my former method: I make a lined tube, using the method described in the above-mentioned application, with a nickel lining somewhat heavier than would be required to protect it from corrosion. I then take this compound tube, which has a substantial wall sufficiently heavy for securing a satisfactory weld, and in a secondary operation weld this compound tube into a pierced blank. This secondary operation of welding may be accomplished by telescoping the compound tube within the heavy-walled hollow steel blank, heating it to a welding-heat and rolling it over a mandrel, so as to reduce its thickness and elongate it, thus welding the primary compound tube firmly to the hollow steel blank. On account of the thicker lining used the nickel retains its relative thickness as compared with the steel and can be rolled and drawn into boiler-tubes with a nickel lining as light as two and one-half per cent., said lining being distributed evenly over the interior surface of the tube, thoroughly protecting the interior surface from oxidation and corrosion.

The following statement will afford working directions of the best nature now known to me of applying the principles of this new method for the making of a six-per-cent. nickel-lined tube; but those skilled in the art can modify it in many ways so as to produce tubes of different thicknesses of lining, so as to meet different conditions and requirements, without departing from the intended spirit of the invention.

I first take a round billet of malleable nickel, pierce it, and roll it into the form of a tube having, say, a three-sixteenth-inch wall. I then cut this nickel tube into pieces of the desired length and telescope them into steel billets having walls, say, nine-sixteenths of an inch thick, the welding-surfaces of both the steel blank and the nickel tube having been cleaned from scale. I then heat such composite blanks after having expanded the ends of the nickel tube or otherwise taken precaution to prevent oxidizing of the meeting surfaces of the nickel and steel and roll the same out into a compound tube of, say, three-sixteenths-inch wall. This step of the operation is illustrated in Fig. 1, in which the numeral 2 designates the pierced billet, and 3 the nickel lining. 4 is the mandrel over which the rolling operation is done, and 5 designates rolls of any suitable character. In the original composite blank the thickness of the steel was nine-sixteenths of an inch and the nickel three-sixteenths of an inch, or twenty-five per cent. This same relative thickness of nickel and steel exists in the rolled tube, or nine sixty-fourths of the thickness is steel and three sixty-fourths, or twenty-five per cent., is nickel. I then take this compound tube and cut it into pieces of the desired length and telescope these pieces into pierced billets of steel, with walls, say, five-eighths of an inch thick. This operation is illustrated in Fig. 2, in which the originally-formed tube, composed of the steel portion 2 and the nickel lining 3, are shown as inserted in a pierced steel blank 6. 7 is the mandrel, and 8 designates any suitable rolls. This double composite blank or billet has a steel wall five-eighths of an inch thick or forty sixty-fourths plus nine sixty-fourths, or forty-nine sixty-fourths, and a nickel lining of three sixty-fourths, or almost six per cent. of the total. I then take this double composite blank, weld and elongate it by means of rolling over a mandrel, and reduce it to a tube with a three-sixteenths-inch wall, the nickel and steel retaining their same relative thickness. This tube can then be cold-drawn into different sizes and gages, as required. This same method for securing a thin covering for the outside of tubes can be employed by first making a nickel-covered tube with the nickel covering relatively heavier than would be required for non-corrosive purposes, then telescoping this covered tube over a heavy-walled pierced billet, welding the same, and rolling it down to the necessary thickness. The same proportions of steel and nickel can be used as are given in the making of the six-per-cent. lined tube, if so desired. This same method can be used for producing a tube with both a thin interior lining and a thin exterior covering by first making a tube as described above with a thin nickel lining and telescoping it into a similarly-made tube with a thin nickel covering and heating, welding, and rolling the same over a mandrel, as previously described.

Attention is called to the fact that in preparing the original nickel tube for use as a lining-tube in the primary steel blank it is not necessary to cold-draw it; also, that in using the lined tube made in the first welding operation as a lining-tube for use in the secondary operation a hot-rolled tube is used. The omitting of the cold-drawing operation in the preparation of the tubes used for lining purposes very materially decreases the mill costs of this new method, and the total manufacturing costs (exclusive of the value of the steel and nickel) are no more than in my original method, and by its use we can greatly reduce the amount of nickel required, as tubes with a lining as light as two and one-half per cent. have been successfully made in the manner described.

The method of welding and rolling used for making either the lined or covered tube or a tube both lined and covered can be changed or modified from that described without departing from the spirit of this invention, which pertains, primarily, to the means used in securing a thin lining or covering of even thickness by telescoping into or over a heavy-walled steel or iron blank a tube that has already been lined or covered with nickel in such a manner as will preserve the proportional thicknesses of steel and nickel and then welding and rolling same down to a tube of the desired sizes and thickness with the object of securing a thinner and more even lining or covering than can be secured by primarily telescoping a nickel lining or covering into or over a heavy-walled hollow billet, then welding and rolling the same down to a tube of the desired size and thickness of wall. By this method of manufacture I overcome the difficulties above referred to, since the greater thickness of the nickel lining employed in the first welding and reducing operation is sufficient to maintain a proper thickness of the lining at all points in the finished tube.

In the following claims I use the term "tubular sheathing" generically as meaning a tube of nickel applied either to the interior or exterior of the finished tube.

I claim—

1. The method herein described of making a compound iron or steel tube with a thin tubular sheathing of nickel or nickel alloy welded thereto, which consists in telescoping a tubular iron or steel blank with an iron or steel tube which has previously had a nickel or nickel-alloy tubular sheathing welded thereto, bringing the iron or steel surfaces into contact with each other, then heating, welding and rolling this compound blank into a tube for the purpose of securing a thin and even nickel sheathing; substantially as described.

2. The method herein described of making a compound iron or steel tube with a thin nickel or nickel-alloy lining welded thereto, which consists in telescoping into a heavy tubular iron or steel blank an iron or steel tube which has previously had a nickel lining welded thereto, then heating, welding and rolling this compound blank into a tube for the purpose of securing a thin and even nickel lining; substantially as described.

3. The method herein described of making a compound iron or steel tube with a thin nickel or nickel-alloy lining and covering welded thereto, which consists in telescoping over a heavy tubular iron or steel blank an iron or steel tube which has a nickel covering welded thereto, and telescoping thereinto an iron or steel tube which has a nickel lining welded thereto, then heating, welding and rolling this double compound blank into a tube for the purpose of securing a thin and even nickel covering and lining; substantially as described.

In testimony whereof I have hereunto set my hand May 15, 1905.

JOHN H. NICHOLSON.

Witnesses:
THOMAS W. BAKEWELL,
H. M. CORWIN.